United States Patent
Bao et al.

(10) Patent No.: US 11,731,092 B2
(45) Date of Patent: Aug. 22, 2023

(54) METHOD OF MAKING CARBONATE PCD AND SINTERING CARBONATE PCD ON CARBIDE SUBSTRATE

(71) Applicant: Smith International, Inc., Houston, TX (US)

(72) Inventors: Yahua Bao, Orem, UT (US); J. Daniel Belnap, Lindon, UT (US); Anatoliy Garan, Provo, UT (US); Michael David France, Lehi, UT (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1082 days.

(21) Appl. No.: 16/420,696

(22) Filed: May 23, 2019

(65) Prior Publication Data

US 2019/0275484 A1  Sep. 12, 2019

Related U.S. Application Data

(62) Division of application No. 14/079,763, filed on Nov. 14, 2013, now Pat. No. 10,315,175.
(Continued)

(51) Int. Cl.
*B01J 3/06* (2006.01)
*B24D 18/00* (2006.01)
(Continued)

(52) U.S. Cl.
CPC ............... *B01J 3/06* (2013.01); *B22F 7/062* (2013.01); *B23B 27/20* (2013.01);
(Continued)

(58) Field of Classification Search
CPC ....................................................... B24D 3/00
See application file for complete search history.

(56) References Cited

U.S. PATENT DOCUMENTS 5,912,217 A ‡ 6/1999 Sumiya .................... B01J 3/062
51/307
6,248,447 B1  6/2001 Griffin et al.
(Continued)

FOREIGN PATENT DOCUMENTS

GB  2483163 A ‡ 2/2012 .............. B01J 3/062
GB  2483163 A   2/2012
(Continued)

OTHER PUBLICATIONS

International Search Report and Written Opinion issued in PCT/US2013/070289 dated Feb. 19, 2014, 14 pages.‡
(Continued)

*Primary Examiner* — Alexandra M Moore
(74) *Attorney, Agent, or Firm* — Jeffrey D. Frantz

(57) ABSTRACT

A method of forming a polycrystalline diamond body includes mixing a sintering agent with diamond powder to form a premixed layer, the sintering agent including at least one alkaline earth metal carbonate; forming an infiltration layer adjacent to the premixed layer, the infiltration layer including an infiltrant material including at least one alkaline earth metal carbonate; and subjecting the premixed layer and the infiltration layer to high pressure high temperature conditions.

8 Claims, 10 Drawing Sheets

Related U.S. Application Data

(60) Provisional application No. 61/726,719, filed on Nov. 15, 2012.

(51) Int. Cl.
    *B24D 3/00*        (2006.01)
    *E21B 10/567*    (2006.01)
    *C01B 32/26*     (2017.01)
    *B23B 27/20*     (2006.01)
    *B22F 7/06*      (2006.01)
    *C22C 26/00*     (2006.01)
    *B23B 27/14*     (2006.01)
    *B22F 5/00*      (2006.01)

(52) U.S. Cl.
    CPC .......... *B24D 18/0009* (2013.01); *C01B 32/26* (2017.08); *C22C 26/00* (2013.01); *E21B 10/567* (2013.01); *B22F 2005/001* (2013.01); *B22F 2999/00* (2013.01); *B23B 27/148* (2013.01); *B24D 3/00* (2013.01)

(56) References Cited

U.S. PATENT DOCUMENTS

| | | | | |
|---|---|---|---|---|
| 6,861,137 | B2 ‡ | 3/2005 | Griffin | E21B 10/567 428/21 |
| 7,493,973 | B2 ‡ | 2/2009 | Keshavan | B01J 3/062 175/37 |
| 7,621,974 | B2 ‡ | 11/2009 | Yamamoto et al. | |
| 7,635,035 | B1 * | 12/2009 | Bertagnolli | B24D 3/10 51/307 |
| 7,950,477 | B1 ‡ | 5/2011 | Bertagnolli et al. | |
| 7,963,617 | B2 ‡ | 6/2011 | Hall et al. | B02C 2/02 175/43 |
| 7,985,470 | B2 ‡ | 7/2011 | Kuroda et al. | B22F 7/062 428/32 |
| 8,043,533 | B2 ‡ | 10/2011 | Tajima et al. | C04B 35/52 252/50 |
| 8,109,349 | B2 ‡ | 2/2012 | Hall et al. | E21B 10/5673 175/42 |
| 2005/0263328 | A1 ‡ | 12/2005 | Middlemiss | |
| 2006/0263233 | A1 ‡ | 11/2006 | Gardinier | A61F 2/30767 419/11 |
| 2008/0250724 | A1 ‡ | 10/2008 | Hall | B24D 99/005 51/307 |
| 2008/0302579 | A1 ‡ | 12/2008 | Keshavan et al. | |
| 2009/0133938 | A1 ‡ | 5/2009 | Hall | C22C 26/00 175/43 |
| 2009/0221773 | A1 ‡ | 9/2009 | Linford et al. | B01J 20/286 526/16 |
| 2010/0307067 | A1 ‡ | 12/2010 | Sigalas | C04B 35/52 51/307 |
| 2010/0320423 | A1 | 12/2010 | Tajima et al. | |
| 2011/0017517 | A1 | 1/2011 | Scott et al. | |
| 2011/0023375 | A1 ‡ | 2/2011 | Sani | B22F 3/24 51/297 |
| 2011/0036643 | A1 ‡ | 2/2011 | Belnap et al. | C22C 26/00 175/43 |
| 2011/0139514 | A1 ‡ | 6/2011 | Voronin et al. | C04B 35/52 175/42 |
| 2011/0252712 | A1 ‡ | 10/2011 | Chakraborty et al. | B01J 3/062 51/298 |
| 2011/0252713 | A1 ‡ | 10/2011 | Chakraborty et al. | B01J 3/062 51/298 |
| 2011/0300767 | A1 ‡ | 12/2011 | Cariveau et al. | D06P 5/2011 442/12 |
| 2012/0102843 | A1 ‡ | 5/2012 | Chakraborty et al. | C01B 32/28 51/295 |
| 2012/0125696 | A1 ‡ | 5/2012 | Belnap et al. | B22F 3/15 175/43 |
| 2012/0241224 | A1 ‡ | 9/2012 | Qian et al. | |
| 2012/0261197 | A1 ‡ | 10/2012 | Miess et al. | |
| 2013/0043078 | A1 ‡ | 2/2013 | Qian | B22F 7/062 175/428 |
| 2013/0105232 | A1 | 5/2013 | Vail et al. | |
| 2014/0130418 | A1 | 5/2014 | Bao et al. | |
| 2014/0131117 | A1 ‡ | 5/2014 | Bao | B24D 18/0009 175/428 |

FOREIGN PATENT DOCUMENTS

| | | | |
|---|---|---|---|
| JP | H0474766 | A ‡ | 3/1992 |
| JP | H0474766 | A | 3/1992 |
| JP | H04114966 | A ‡ | 4/1992 |
| JP | H04114966 | A | 4/1992 |
| JP | H09110541 | A ‡ | 4/1997 |
| JP | H09110541 | A | 4/1997 |
| JP | 2002187775 | A | 7/2002 |

OTHER PUBLICATIONS

Akaishi et al., Synthesis of polycrystalline diamond compact with magnesium carbonate and its physical properties. Diamond and related materials, vol. 5, Issue 1, pp. 2-7, 1996.‡

Westraadt et al., Thermally stable polycrystalline diamond sintered with calcium carbonate, Diamond and related materials, vol. 16, Issue 11, pp. 1929-1935, 2007.‡

Akaishi, Minoru, Synthesis of fine-grained polycrystalline diamond with carbonate as a sintering agent, Program and Abstracts of Papers. High Pressure Conference of Japan, Oct. 20, 2000, p. 108, vol. 41, 2 pages.‡

International Preliminary Report on Patentability issued in corresponding International Application PCT/US2013/070289 dated May 28, 2015. 11 pages.‡

First Office Action and Search Report issued in corresponding Chinese application 201380068700.8 dated Nov. 21, 2016. Includes English translation. 18 pages.‡

Second Office Action and Supplementary Search Report issued in corresponding Chinese application 201380068700.8 dated Feb. 16, 2016. Includes English translation. 18 pages.‡

International Search Report and Written Opinion issued in International Patent Application PCT/US2013/070289 dated Feb. 19, 2014, 14 pages.

International Preliminary Report on Patentability issued in International Patent Application PCT/US2013/070289 dated May 28, 2015, 11 pages.

First Office Action and Search Report issued in corresponding Chinese application 201380068700.8 dated Nov. 21, 2016, 18 pages.

Second Office Action and Supplementary Search Report issued in corresponding Chinese application 201380068700.8 dated Feb. 16, 2016, 18 pages.

Akaishi, Minoru, Synthesis of fine-grained polycrystalline diamond with carbonate as a sintering agent. 2000.

Itoh, et al, Microstructural control of boundary region between CVD diamond film and cemented substrate, Journal of Materials Science 29 (1994) 1404-1410.

Lima, et al. "Study of the diamond 5%wt-cobalt sintering under the HPHT lowest limit", Material Science Forum vols. 498-499, Nov. 2005. pp. 225-231.

Sneddon, et al, "Polycrystalline Diamond: Manufacture, wear mechanisms, and implications for bit design", Jouranal of Petroleum Technology, Dec. 1988, pp. 1593-1601.

Tang, et al., "Adherent Diamond coatings on cemented carbide substrates with different cobalt contents", Diamond and Related Materials 10 (2001) 1700-1704.

Examination Report issued in British patent application 1508404.9 dated Oct. 11, 2019, 5 pages.

\* cited by examiner
‡ imported from a related application

METHOD OF MAKING CARBONATE PCD AND SINTERING CARBONATE PCD ON CARBIDE SUBSTRATE

CROSS-REFERENCE OF RELATED APPLICATIONS

This application is a divisional application of U.S. patent application Ser. No. 14/079,763, filed on Nov. 14, 2013, which claims the benefit of and priority to U.S. Provisional Patent Application No. 61/726,719, filed on Nov. 15, 2012, both of which are herein incorporated by reference in their entirety.

BACKGROUND

Polycrystalline diamond ("PCD") materials and PCD elements formed therefrom are well known in the art. Conventional PCD may be formed by subjecting diamond particles in the presence of a suitable solvent metal catalyst material to processing conditions of high pressure/high temperature (HPHT), where the solvent metal catalyst promotes desired intercrystalline diamond-to-diamond bonding between the particles, thereby forming a PCD structure. The resulting PCD structure produces enhanced properties of wear resistance and hardness, making such PCD materials extremely useful in aggressive wear and cutting applications where high levels of wear resistance and hardness are desired. FIG. 1 illustrates a microstructure of conventionally formed PCD material 10 including a plurality of diamond grains 12 that are bonded to one another to form an intercrystalline diamond matrix first phase. The catalyst/binder material 14, e.g., cobalt, used to facilitate the diamond-to-diamond bonding that develops during the sintering process is dispersed within the interstitial regions formed between the diamond matrix first phase. The term "particle" refers to the powder employed prior to sintering a superabrasive material, while the term "grain" refers to discernable superabrasive regions subsequent to sintering, as known and as determined in the art.

The catalyst/binder material used to facilitate diamond-to-diamond bonding can be provided generally in two ways. The catalyst/binder can be provided in the form of a raw material powder that is pre-mixed with the diamond grains or grit prior to sintering. In some cases, the catalyst/binder can be provided by infiltration into the diamond material (during high temperature/high pressure processing) from an underlying substrate material that the final PCD material is to be bonded to. After the catalyst/binder material has facilitated the diamond-to-diamond bonding, the catalyst/binder material is generally distributed throughout the diamond matrix within interstitial regions formed between the bonded diamond grains. Particularly, as shown in FIG. 1, the binder material 14 is not continuous throughout the microstructure in the conventional PCD material 10. Rather, the microstructure of the conventional PCD material 10 may have a uniform distribution of binder among the PCD grains. Thus, crack propagation through conventional PCD material will often travel through the less ductile and brittle diamond grains, either transgranularly through diamond grain/binder interfaces 15, or intergranularly through the diamond grain/diamond grain interfaces 16.

Solvent catalyst materials may facilitate diamond intercrystalline bonding and bonding of PCD layers to each other and to an underlying substrate. Solvent catalyst materials typically used for forming conventional PCD include metals from Group VIII of the Periodic table, such as cobalt, iron, or nickel and/or mixtures or alloys thereof, with cobalt being the most common. Conventional PCD may include from 85 to 95% by volume diamond and a remaining amount of the solvent catalyst material. However, while higher metal content typically increases the toughness of the resulting PCD material, higher metal content also decreases the PCD material hardness, thus limiting the flexibility of being able to provide PCD coatings having desired levels of both hardness and toughness. Additionally, when variables are selected to increase the hardness of the PCD material, typically brittleness also increases, thereby reducing the toughness of the PCD material.

PCD is commonly used in earthen drilling operations, for example in cutting elements used on various types of drill bits. Although PCD is extremely hard and wear resistant, PCD cutting elements may still fail during normal operation. Failure may occur in three common forms, namely wear, fatigue, and impact cracking. The wear mechanism occurs due to the relative sliding of the PCD relative to the earth formation, and its prominence as a failure mode is related to the abrasiveness of the formation, as well as other factors such as formation hardness or strength, and the amount of relative sliding involved during contact with the formation. Excessively high contact stresses and high temperatures, along with a very hostile downhole environment, also tend to cause severe wear to the diamond layer. The fatigue mechanism involves the progressive propagation of a surface crack, initiated on the PCD layer, into the material below the PCD layer until the crack length is sufficient for spalling or chipping. Lastly, the impact mechanism involves the sudden propagation of a surface crack or internal flaw initiated on the PCD layer, into the material below the PCD layer until the crack length is sufficient for spalling, chipping, or catastrophic failure of the cutting element.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments of the present disclosure relate to a method of forming a polycrystalline diamond body that includes mixing a sintering agent with diamond powder to form a premixed layer, where the sintering agent includes at least one of an alkaline earth metal carbonate, forming an infiltration layer adjacent to the premixed layer, where the infiltration layer includes an infiltrant material selected from at least one of an alkaline earth metal carbonate, and subjecting the premixed layer and the infiltration layer to high pressure high temperature conditions.

In another aspect, embodiments of the present disclosure relate to a method of forming a diamond construction that includes disposing a carbonate-based polycrystalline material in a sintering container, where the carbonate-based polycrystalline material includes diamond and a carbonate material selected from at least one of an alkaline earth carbonate, placing a substrate in the sintering container, and subjecting the sintering container and contents therein to high pressure high temperature conditions to form a carbonate-based polycrystalline diamond body bonded to the substrate.

In another aspect, embodiments of the present disclosure relate to a cutting element that includes a carbonate-based polycrystalline diamond body having a working surface, where the carbonate-based polycrystalline diamond body has a plurality of bonded together diamond grains forming a matrix phase, a plurality of interstitial regions interposed between the bonded together diamond grains, and a carbonate material disposed within the interstitial regions, and a substrate distal from the working surface.

In yet another aspect, embodiments of the present disclosure relate to a method of forming a polycrystalline diamond body that includes disposing a diamond layer in a sintering container, forming an infiltration layer adjacent to the diamond layer, where the infiltration layer includes an infiltrant material selected from at least one of an alkaline earth metal carbonate, and subjecting the sintering container and contents therein to high pressure high temperature conditions.

Other aspects and advantages of the claimed subject matter will be apparent from the following description and the appended claims.

BRIEF DESCRIPTION OF DRAWINGS

Embodiments of the present disclosure are described with reference to the following figures. The same numbers are used throughout the figures to reference like features and components.

DETAILED DESCRIPTION

Figure 1:
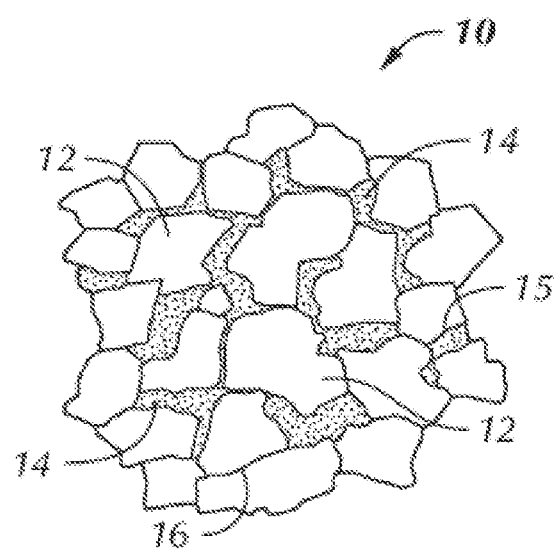
FIG. 1 shows the microstructure of conventionally formed polycrystalline diamond.

As used herein, the term carbonate-based polycrystalline diamond refers to the resulting material produced by subjecting individual diamond particles in the presence of a carbonate material to sufficiently high pressure high temperature (HPHT) conditions that causes intercrystalline bonding to occur between adjacent diamond crystals to form a network or matrix phase of diamond-to-diamond bonding and a plurality of interstitial regions dispersed between the bonded together diamond grains. Carbonate-based polycrystalline diamond of the present disclosure may be referred to as polycrystalline diamond or PCD, but is distinguished from conventionally formed polycrystalline diamond (described in the background section) formed with a transition metal solvent catalyst.

A carbonate-based polycrystalline diamond body may have a microstructure including a matrix phase of a plurality of bonded together diamond grains with a plurality of interstitial regions interposed between the bonded together diamond grains and a carbonate material disposed within the interstitial regions, where the carbonate material is selected from an alkaline earth metal carbonate or from a combination of at least one alkali metal carbonate and/or at least one alkaline earth metal carbonate. In carbonate-based polycrystalline diamond material of the present disclosure, inclusion of a transition metal catalyst, silicon, and/or a silicon-containing compound is not necessary for formation of diamond-to-diamond bonds, and thus the carbonate-based polycrystalline diamond bodies may not contain such materials. However, in some embodiments, a carbonate-based polycrystalline diamond body may include small amounts of a transition metal catalyst, such as cobalt, in addition to the diamond and carbonate material, due to infiltration during sintering and/or by premixing the transition metal with the diamond and carbonate materials. In such embodiments, carbonate-based PCD having small amounts of transition metal may include, for example, between 0 and 4 percent by weight of the transition metal, between 0 and 2 percent by weight of the transition metal, or between 0 and 1 percent by weight of the transition metal.

Method of Forming a Carbonate-Based Polycrystalline Diamond Body

A carbonate-based polycrystalline diamond body of the present disclosure may be formed using both a carbonate sintering agent and an infiltrant material. For example, a method of forming a polycrystalline diamond body may include mixing a sintering agent with diamond powder to form a premixed layer, where the sintering agent is selected from at least one of an alkali metal carbonate and/or at least one of an alkaline earth metal carbonate. An infiltration layer may then be formed adjacent to the premixed layer, where the infiltration layer includes an infiltrant material selected from at least one of an alkali metal carbonate and/or at least one of an alkaline earth metal carbonate. The premixed layer and the infiltration layer may then be subjected to high pressure high temperature conditions, such as pressures greater than 6 GPa and temperatures greater than 1700° C. and within the region of diamond thermodynamic stability. For example, in some embodiments, the layers may be subjected to a pressure of 6-8 GPa and a temperature of greater than 2,000° C., or to a pressure of 8-10 GPa and a temperature of greater than 2,000° C.

Diamond particles used in the diamond and carbonate mixture may include, for example, natural or synthetic diamond, and may have varying particle sizes, depending on the end use application. For example, diamond particles may range in size from submicrometer to 100 micrometers (fine and/or coarse sized), and from 1-5 micrometers in some embodiments, from 5-10 micrometers in other embodiments, and from 15-20 micrometers in yet other embodiments. Further, diamond particles may have a monomodal distribution (having the same general average particle size) or a multimodal distribution (having different volumes of different average particle sizes). Carbonate materials that may be used to form the sintering agent and/or the infiltrant material may include alkali metal carbonates and/or alkaline earth metal carbonates, such as, for example, magnesium carbonate or calcium carbonate. The carbonate material may have a particle size ranging from submicron to 100 micrometers and from 0.1 to 30 micrometers in some embodiments.

A sintering agent and/or an infiltrant material may also optionally include a carbon additive. For example, in addition to an alkali metal carbonate and/or an alkaline earth metal carbonate material, a sintering agent and/or infiltrant material may also include a carbon additive such as graphite, diamond, soot or amorphous carbon. Upon subjecting the premixed layer and adjacent infiltration layer to HPHT, the carbon additive may be incorporated and dispersed throughout the polycrystalline diamond body. For example, according to some embodiments, a sintering agent may include graphite (in addition to a carbonate material), which is dispersed throughout a premixed layer and may convert to diamond upon being subjected to HPHT conditions, thereby providing increased diamond density within the polycrystalline diamond body. According to some embodiments, a sintering agent may include up to about 6 percent by volume of a carbon additive and an infiltrant material may include up to about 20 percent by volume of a carbon additive.

According to some embodiments of the present disclosure, the sintering agent and the infiltrant material may be formed of the same material. For example, a premixed layer may be formed by mixing an amount of magnesium carbonate with diamond powder, and an infiltration layer made of magnesium carbonate may be formed adjacent to the premixed layer, such that upon subjecting the layers to high pressure high temperature conditions, the magnesium carbonate of the infiltration layer infiltrates into the premixed layer.

However, according to other embodiments of the present disclosure, the sintering agent and the infiltrant material may be formed of different materials. For example, a premixed layer may be formed by mixing an amount of a sintering agent with diamond powder, and an infiltration layer made of an infiltrant material may be formed adjacent to the premixed layer, where the sintering agent has a lower melting point than the infiltrant material. For example, a premixed layer may include diamond powder mixed with calcium carbonate, and an adjacent infiltration layer may be formed of a magnesium carbonate infiltrant material. Further, according to some embodiments, a premixed layer may include more than one carbonate material and/or an infiltration layer may include more than one carbonate material. For example, according to one or more embodiments, a premixed layer and/or an infiltration layer may include both magnesium carbonate and calcium carbonate.

A premixed carbonate/diamond layer may include an amount of sintering agent ranging from greater than 0 percent by volume to about 8 percent by volume of the premixed layer depending on grain size and the thickness of the polycrystalline diamond body. Other embodiments may include an amount of sintering agent ranging from a lower limit of any of 0.1 percent, 1.0 percent, 2.0 percent or 3.0 percent by volume and an upper limit of any of 2.0 percent, 3.0 percent, 4.0 percent, 5.0 percent, 6.0 percent, 7.0 percent, 8.0 percent, 9.0 percent or 10.0 percent by volume, where any lower limit can be used in combination with any upper limit. Using a small amount of premixed carbonate may promote the infiltration depth and final sintering.

Additionally, an infiltration layer may include an amount of infiltrant material ranging from about 1 to about 20 percent by volume of the sintered polycrystalline diamond body. According to other embodiments, the amount of infiltrant material may be greater than 20 percent by volume, greater than 30 percent by volume or greater than 50 percent by volume of the sintered polycrystalline diamond body.

However, other amounts of infiltrant material may be provided to ensure infiltration through the entire premixed layer. For example, the amount of infiltrant material placed adjacent to the premixed layer and forming the infiltration layer may vary, depending on the size and thickness of the premixed layer, such that the amount is sufficient for full infiltration of the premixed layer. For example, in embodiments having a relatively thick premixed layer, a relatively large weight percent of infiltrant material may be provided so that upon subjecting the premixed layer and adjacent infiltration layer to HPHT, the infiltrant material may infiltrate the entire premixed layer to form the polycrystalline diamond body. In some embodiments having a relatively thinner premixed layer, a relatively smaller weight percent of infiltrant material may be used to infiltrate the entire premixed layer.

Figure 11:
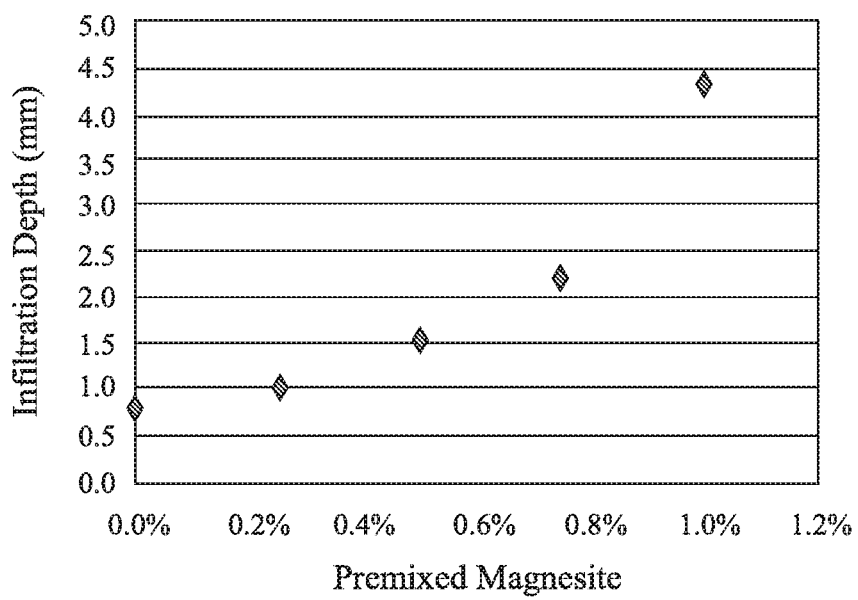
FIG. 11 shows a comparison of infiltration depth to the amount of premixed magnesium carbonate.

Further, the sintering agent may be mixed with diamond powder to form a premixed layer such that the sintering agent is uniformly distributed throughout the premixed layer. In other embodiments, the sintering agent may be non-uniformly distributed throughout the premixed layer. For example, the sintering agent may be distributed as a gradient throughout the premixed layer. A premixed sintering agent distributed throughout the premixed carbonate/diamond layer and subjected to HPHT conditions may provide localized regions that wet the diamond particles throughout the premixed carbonate/diamond layer. These regions of liquid premixed carbonate may provide channels through the diamond material, which may help provide a path for an adjacent carbonate infiltrant material to melt and flow through during the HPHT conditions. Thus, upon subjecting a premixed layer and adjacent infiltration layer to HPHT conditions according to methods of the present disclosure, the infiltrant material may be disposed throughout the entire sintered polycrystalline diamond body. FIG. 11 shows the relationship between the infiltration depth of a magnesium carbonate infiltrant and a premixed amount of magnesium carbonate in a premixed layer during sintering conditions of about 7.0 GPa and about 2,300° C. As shown, the infiltration depth increases as the amount of carbonate sintering agent within the premixed layer increases. The specific relationship between infiltration and premixed sintering agent amount will vary by grain size of the diamond.

Methods of the present disclosure may provide thermally stable polycrystalline diamond due to the use of carbonates as a sintering agent and an infiltrant material rather than conventionally used metal catalysts, such as cobalt. Further, pathways provided by the premixed sintering agent for the infiltrant material to flow through and infiltrate into an entire diamond layer allows for an increased amount of diamond relative to the amount of carbonate material (i.e., a higher volume density of diamond), and thus may provide the polycrystalline diamond bodies with increased wear or abrasion resistance.

A conventional test for quantifying abrasion resistance is the granite log abrasion test ("GLT") which involves machining the surface of a rotating cylinder of granite, such as Barre or Sierra granite. For example, a GLT test may include rotating the granite log past a half inch (13 mm) diameter cutting disk of PCD. The ratio of the removed granite volume and the worn PCD scar area may be used as an indicator of wear score, where the wear score correlates with wear resistance. For example, a high wear score indicates a high wear resistance, while a lower wear score indicates a relatively lower wear resistance.

A granite log abrasion resistance test was conducted on multiple samples of polycrystalline diamond material of the present disclosure having various amounts of magnesium carbonate material premixed and/or infiltrated into the polycrystalline diamond material. The results are presented below in Table 1.

TABLE 1

Magnesium carbonate sintering agent and infiltrant material.

| Sample | Premixed (wt %) | Infiltration layer (wt %) | Infiltration | Wear Score |
|---|---|---|---|---|
| 1 | 1.0 | 6.7 | Full | 22.37 |
| 2 | 2.0 | 8.0 | Full | 20.79 |
| 3 | 7.0 | 0 | None | 5.97 |
| 4 | 9.0 | 0 | None | 5.46 |
| 5 | — | 4.5 | Incomplete | 19.06 |
| 6 | — | 9.0 | Incomplete | 19.14 |

As shown, methods of the present disclosure that include both a premixed sintering agent and an adjacent infiltration layer formed of carbonate material may result in higher wear scores when compared with methods using a premixed sintering agent alone or infiltration alone. For example, samples 1 and 2 were formed of a layered assembly of a premixed carbonate/diamond layer and an adjacent infiltration layer. Particularly, sample 1 was formed of a premixed carbonate/diamond layer with a carbonate sintering agent forming 1.0 percent by weight of the layered assembly and an infiltration layer made of an infiltrant material forming 6.7 percent by weight of the layered assembly, while sample 2 was formed of a premixed carbonate/diamond layer with a carbonate sintering agent forming 2.0 percent by weight of the layered assembly and an infiltration layer made of an infiltrant material forming 8.0 percent by weight of the layered assembly. Samples 3 and 4 were formed without an infiltration layer. Particularly, sample 3 was formed from a premixed carbonate/diamond layer with a carbonate sintering agent forming 7.0 percent by weight of the premixed layer, while sample 4 was formed from a premixed carbonate/diamond layer with a carbonate sintering agent forming 9.0 percent by weight of the premixed layer. As shown, although samples 1 and 2 were formed with similar amounts of carbonate material as samples 3 and 4, samples 1 and 2 had higher wear scores, thus indicating a higher wear resistance than that of samples 3 and 4.

Referring still to Table 1, sample 5 was formed using a simple infiltration method (as mentioned above), where a diamond layer made entirely of diamond powder was infiltrated by a layer of infiltrant material forming 4.5 percent by weight of the diamond layer. Although samples 1 and 2 were formed using comparatively greater amounts of carbonate material (and thus less diamond) than sample 5, samples 1 and 2 showed higher wear scores, thus indicating a higher wear resistance. Further, samples 1 and 2 showed full infiltration of the carbonate infiltrant material into the premixed diamond layer, whereas sample 5 showed incomplete infiltration of the carbonate infiltrant material through the diamond layer.

According to embodiments of the present disclosure, polycrystalline diamond bodies may be used directly within a down hole cutting tool, or may be attached to a substrate prior to securing to a downhole tool. For example, according to some embodiments of the present disclosure, a carbonate-based polycrystalline diamond body may be bonded to a substrate using a single cycle high pressure high temperature (HPHT) process to form a diamond construction (described below). Such methods may include disposing a carbonate-based polycrystalline material in a sintering container, placing a substrate in the sintering container, and subjecting the sintering container and the contents therein to HPHT conditions to form a carbonate-based polycrystalline diamond body bonded to the substrate. Further, as discussed in detail below, a carbonate-based PCD may be attached to a substrate with or without use of a transition layer.

Figure 2:
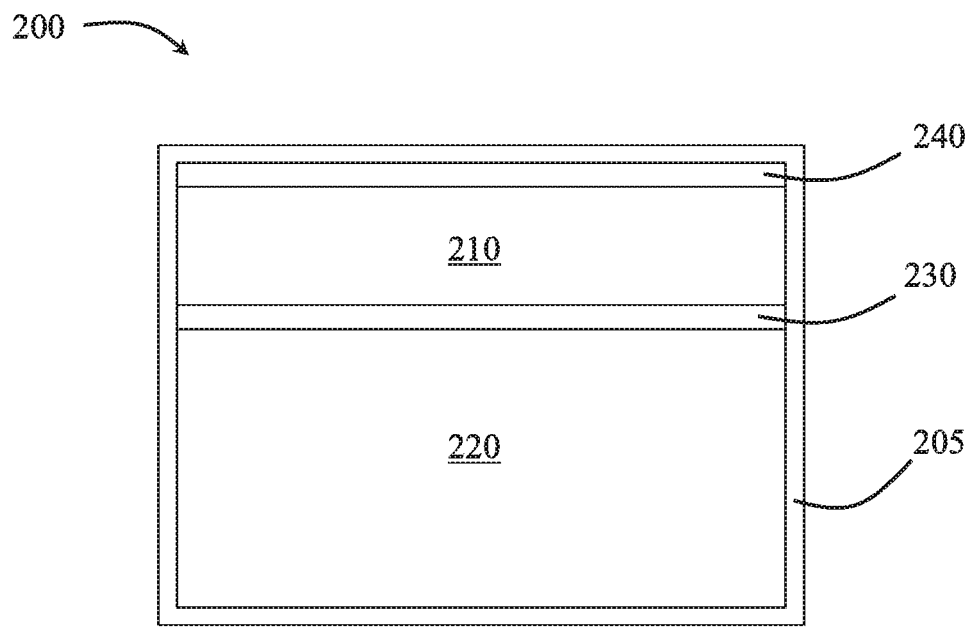
FIG. 2 shows a cross-sectional view of a carbonate-based polycrystalline diamond assembly according to embodiments of the present disclosure.

Sintering Carbonate-Based PCD on a Substrate by a Single Cycle HPHT Process Using a Transition Layer According to methods of the present disclosure using a transition layer, a transition layer may be assembled between a carbonate-based polycrystalline material (such as the premixed layer described above) and a substrate in a sintering container prior to subjecting the sintering container and the contents therein to HPHT conditions to form a carbonate-based polycrystalline diamond body bonded to the substrate. For example, FIG. 2 shows an assembly for sintering a carbonate-based PCD material to a substrate using a transition layer. The assembly 200 includes a carbonate-based PCD material 210 and a substrate 220 placed in a sintering container 205. A transition layer 230 is disposed between the carbonate-based PCD material 210 and the substrate 220. Each of the PCD material 210, the substrate 220, and the transition layer 230 is described in more detail below.

The carbonate-based PCD material 210 may be provided in the sintering container as a preformed PCD body or as a layer of premixed powder, such as the premixed diamond layer described above. As discussed above, the carbonate-based PCD material may be formed of diamond, a carbonate material selected from at least one of an alkaline earth metal carbonate or a combination of an alkaline earth metal carbonate and an alkali metal carbonate, and optionally, a transition metal catalyst material. For example, according to some embodiments of the present disclosure, a carbonate-based polycrystalline material may include diamond and between 0 and 4 percent by weight of a carbonate material, between 0 and 2 percent by weight of a carbonate material in other embodiments, or between 0 and 1 percent by weight of a carbonate material in yet other embodiments. However, in some embodiments, the carbonate-based polycrystalline diamond material may include greater than 4 percent by weight of the carbonate material. In addition to the diamond and carbonate material, a carbonate-based polycrystalline diamond material may include between 0 and 4 percent by weight of a transition metal catalyst in some embodiments, between 0 and 2 percent by weight of a transition metal catalyst in other embodiments, or between 0 and 1 percent by weight of a transition metal catalyst in yet other embodiments. For example, a carbonate-based polycrystalline material may include diamond, between 0 and 4 percent by weight of a carbonate material, and between 0 and 4 percent by weight of a transition metal catalyst. A transition metal catalyst may include, for example, at least one of a Group VIII metal from the Periodic Table, such as iron, nickel or cobalt.

The substrate 220 may be formed of a cemented carbide material, such as cemented tungsten carbide containing a metal binder such as cobalt or other metal selected from Group VIII of the Periodic Table. Substrates used in combination with a transition layer, such as shown in FIG. 2, may include an amount of metal binder of less than 16 percent by weight. In some embodiments, a substrate used in combination with a transition layer may include an amount of metal binder of greater than 6 percent by weight and less than 15 percent by weight, less than 14 percent by weight, or less than 12 percent by weight of the metal binder. In other embodiments, the substrate may include an amount of metal binder of less than or equal to 6 percent by weight.

Further, the substrate 220 may be provided in the sintering container as a preformed substrate or as a powdered substrate material mixture. For example, according to some embodiments, a mixture of carbide powder and cobalt powder may be placed in the sintering container to form the substrate, where the cobalt powder forms less than 15 percent by weight of the mixture. According to other embodiments, a substrate may be preformed from a carbide material and a binder such as by sintering, pressing to form a green compact, hot pressing, or other methods known in the art.

The transition layer 230 may be formed of at least one of a carbide material, a nitride material, or combinations thereof. For example, according to embodiments of the present disclosure, a transition layer may be formed of a transition metal carbide and/or a transition metal nitride, such as WC, TiN or ZrN. The transition layer 230 may be assembled between the PCD material 210 and the substrate 220 as a layer of powdered carbide and/or nitride material. In other embodiments, the transition layer may be coated onto at least one outer surface of the substrate 220, including at least the outer surface 222 facing the PCD material. Such coating methods may include, for example, chemical vapor deposition (CVD) or physical vapor deposition (PVD) methods, or other coating methods known in the art. Further, the transition layer 230 may have a thickness measured between the PCD body 210 and the substrate 220 that ranges from about 1 micron to about 2,000 microns.

Referring still to FIG. 2, an infiltration layer 240 may optionally be placed adjacent to the carbonate-based PCD material 210 and opposite the substrate 220 to infiltrate into the PCD material during the HPHT sintering conditions. The infiltration layer 240 may be made of an infiltrant material, which may include at least one of an alkaline earth metal carbonate, an alkali earth carbonate, or combinations thereof. The infiltrant material may be the same or different carbonate material as the premixed carbonate material (sintering agent) within the diamond layer. The amount of infiltrant material provided as the infiltration layer may be greater than or equal to the amount of infiltrant material used to infiltrate through the entire carbonate-based PCD material 210. In embodiments using an infiltrant material amount greater than that used for complete infiltration (through the entire thickness of the carbonate-based PCD material), the remaining amount of infiltrant material that did not infiltrate during the sintering process may form a carbonate layer adjacent to the carbonate-based PCD body. The carbonate layer may or may not be subsequently removed.

According to other embodiments of the present disclosure, the transition layer may be formed of a mixture of diamond powder and a carbonate material selected from at least one of an alkaline earth metal carbonate or a combination of an alkaline earth metal carbonate and an alkali metal carbonate. The amount of carbonate material used to form the transition layer may range from any lower limit of about 4 percent, 6 percent, 8 percent, 10 percent, 15 percent or 20 percent by weight of the transition layer to any upper limit of 10 percent, 15 percent, 20 percent, 22 percent, 24 percent, 26 percent, 28 percent, or 30 percent by weight of the transition layer. The carbonate material used in the transition layer may be the same or different as the carbonate material in the carbonate-based PCD material and/or the infiltration layer.

Figure 3:
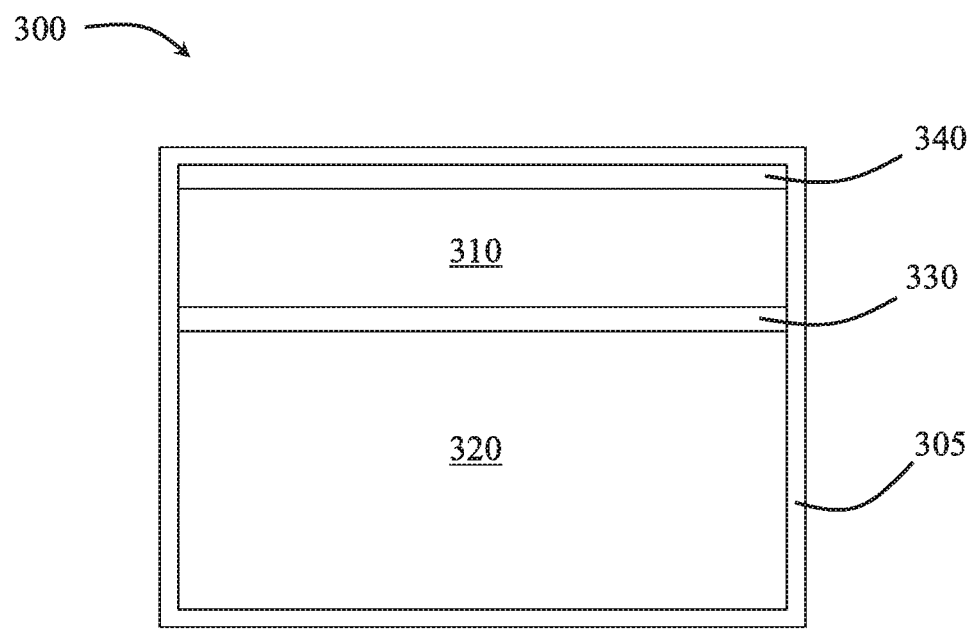
FIG. 3 shows a cross-sectional view of a carbonate-based polycrystalline diamond assembly according to embodiments of the present disclosure.

For example, FIG. 3 shows an assembly for sintering a carbonate-based PCD material to a substrate using a carbonate-based transition layer. The assembly 300 includes a carbonate-based PCD material 310 and a substrate 320 placed in a refractory metal capsule 305 of a sintering container. A transition layer 330 is disposed between the carbonate-based PCD material 310 and the substrate 320. The carbonate-based PCD material 310 may be provided in the sintering container as a preformed PCD body or as a layer of premixed powder. Further, the carbonate-based PCD body may include diamond and a carbonate material selected from at least one of an alkaline earth metal carbonate or a combination of an alkaline earth metal carbonate and an alkali metal carbonate, and optionally, between 0 and 4 percent by weight of a transition metal catalyst. The substrate 320 may be formed of a cemented carbide material, such as cemented tungsten carbide containing a metal binder such as cobalt or other metal selected from Group VIII of the Periodic Table. The transition layer 330 may include diamond powder mixed with between 4 and 30 percent by weight of a transition layer carbonate material selected from at least one of an alkaline earth metal carbonate and/or an alkali metal carbonate. An infiltration layer 340 may optionally be placed adjacent to the carbonate-based PCD material 310 and opposite the substrate 320 to infiltrate into the PCD material during the HPHT sintering conditions. The infiltration layer 340 may be made of an additional carbonate material, such as an alkaline earth metal carbonate, an alkali earth carbonate, or combinations thereof.

Figure 4:
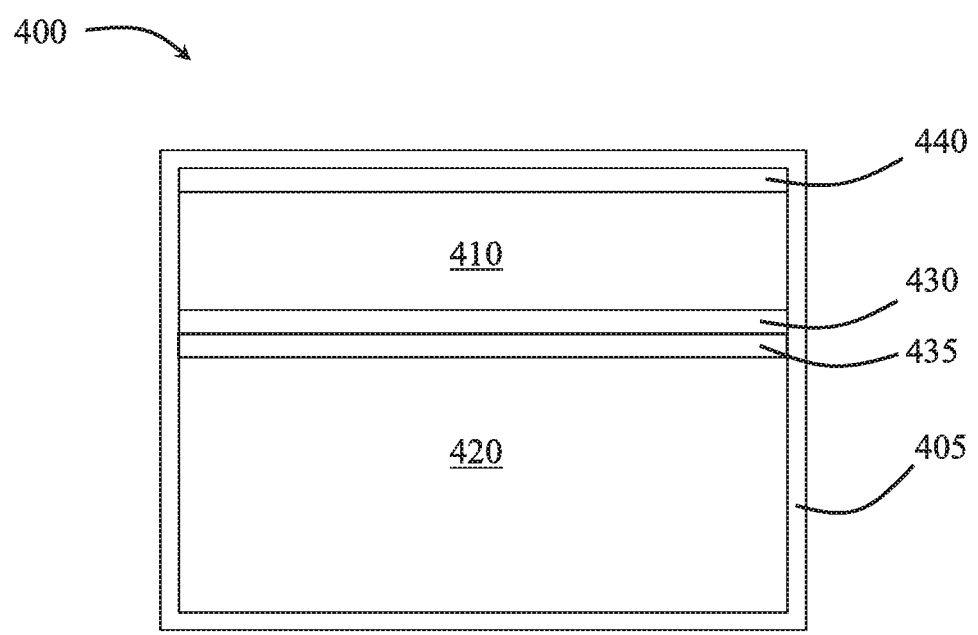
FIG. 4 shows a cross-sectional view of a carbonate-based polycrystalline diamond assembly according to embodiments of the present disclosure.

Further, in some embodiments, a diamond powder layer may be used in combination with a carbonate-based transition layer. For example, FIG. 4 shows an assembly 400 for sintering a carbonate-based PCD material 410 to a substrate 420 using a carbonate-based transition layer 430. The assembly 400 includes a carbonate-based PCD material 410 and a substrate 420 placed in a refractory metal capsule 405 of a sintering container. A carbonate-based transition layer 430 and a diamond powder layer 435 are disposed between the carbonate-based PCD material 410 and the substrate 420. The diamond powder layer 435 or the carbonate-based transition layer 430 may be adjacent to the substrate 420. According to some embodiments, the transition layer may be less than 1,000 µm thick. Carbonate-based transition layers may be used to block or delay cobalt infiltration from the cemented carbide substrate.

Figure 5:
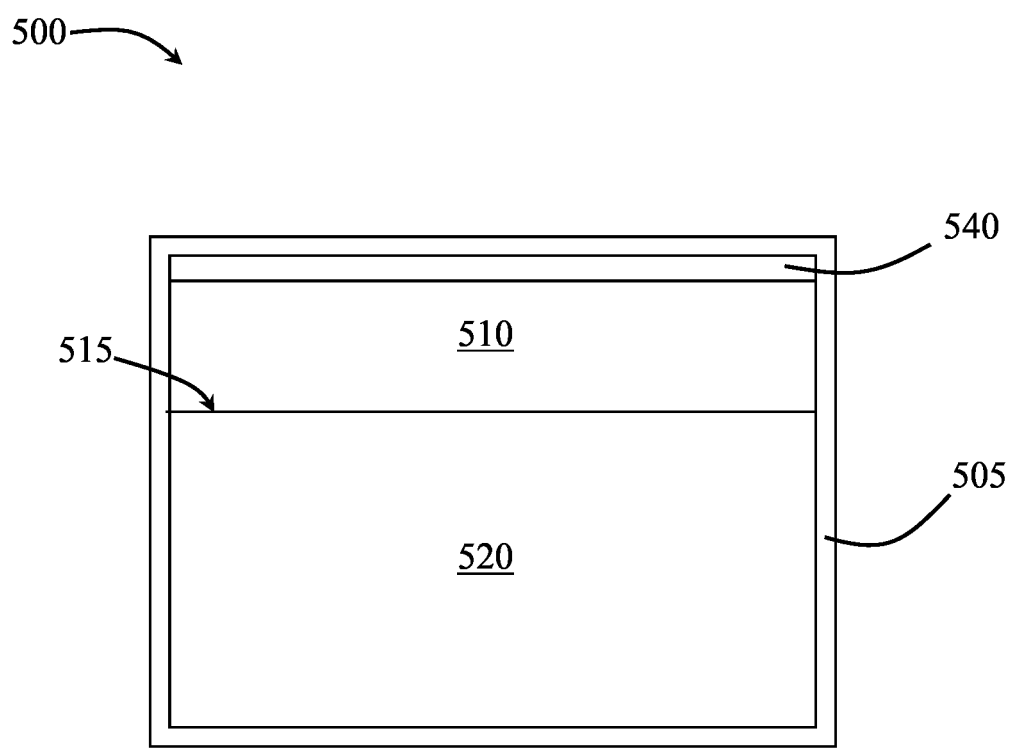
FIG. 5 shows a cross-sectional view of a carbonate-based polycrystalline diamond assembly according to embodiments of the present disclosure.

Sintering Carbonate-Based PCD on a Substrate by a Single Cycle HPHT Process without a Transition Layer According to methods of the present disclosure of sintering carbonate-based PCD on a substrate without a transition layer, a substrate may be assembled directly adjacent to a carbonate-based polycrystalline material in a sintering container prior to subjecting the sintering container and the contents therein to HPHT conditions to form a carbonate-based polycrystalline diamond body bonded to the substrate. For example, FIG. 5 shows an assembly for sintering a carbonate-based PCD material to a substrate without a transition layer. The assembly 500 includes a carbonate-based PCD material 510 and a substrate 520 placed in a sintering container 505, where the PCD material 510 is placed adjacent to the substrate 520 at an interface surface 515. The interface surface 515 shown in FIG. 5 is planar; however, a non-planar interface may be formed between the PCD material and the substrate in other embodiments.

The substrate 520 may be formed of a cemented carbide material, such as cemented tungsten carbide containing a metal binder such as cobalt or other metal selected from Group VIII of the Periodic Table, or other substrate materials known in the art of cutting tools. Substrates used in assemblies without a transition layer, such as shown in FIG. 5, may include an amount of metal binder of less than 10 percent by weight. For example, a substrate may be formed of a cemented tungsten carbide cobalt material having less than 10 percent by weight of cobalt. In other embodiments, a substrate may include an amount of metal binder less than 8 percent by weight. In yet other embodiments, substrates may include an amount of metal binder ranging from a lower limit of any of 4 weight percent, 5 weight percent, 6 weight percent, or 7 weight percent to an upper limit of any of 6 weight percent, 7 weight percent, 8 weight percent, 9 weight percent, or 10 weight percent. In embodiments having a PCD material directly adjacent to a substrate made with a cobalt metal binder (or other transition metal diamond catalyst), the cobalt may infiltrate into the PCD material during HPHT sintering. In such embodiments, the infiltration of the metal binder may be slowed or reduced by including less than 10 percent by weight of the cobalt binder (or other binder made from a transition metal catalyst) in the substrate.

Further, the substrate 520 may be provided in the sintering container as a preformed substrate or as a powdered substrate material mixture. For example, according to some embodiments, a mixture of carbide powder and cobalt powder may be placed in the sintering container to form the substrate, where the cobalt powder forms less than 10 percent by weight of the mixture, or less than 8 percent by weight of the mixture in other embodiments. According to other embodiments, a substrate may be preformed from a carbide material and a binder such as by sintering, pressing to form a green compact, hot pressing, or other methods known in the art.

The carbonate-based PCD material 510 may be provided as a preformed carbonate-based polycrystalline diamond body, or as a powdered mixture within the sintering container 505 and adjacent to the substrate 520. In embodiments using a preformed carbonate-based PCD body, the PCD body may be formed by sintering a mixture of diamond powder and an amount of carbonate material ranging from about 0 to 4 percent by weight (and optionally an amount of a transition metal such as cobalt ranging from about 0 to 4 percent by weight) in some embodiments, or a mixture of diamond powder and an amount of carbonate material greater than 4 percent by weight in other embodiments, such as described above, under HPHT conditions, such as pressures greater than 6.0 GPa and temperatures greater than 1,700° C. In embodiments using a powdered mixture, the powdered mixture may include a mixture of diamond powder, an amount of powdered carbonate material, and optionally an amount of powdered transition metal ranging from about 0 to 4 percent by weight.

Referring still to FIG. 5, an infiltration layer 540 may optionally be placed adjacent to the carbonate-based PCD material 510 and opposite the substrate 520 to infiltrate into the PCD material during the HPHT sintering conditions. The infiltration layer 540 may be made of a second carbonate material (also referred to as an infiltrant material herein), such as an alkaline earth metal carbonate, an alkali earth carbonate, or combinations thereof. The amount of infiltrant material used to form the infiltration layer 540 may be greater than or equal to the amount of infiltrant material used to infiltrate the entire layer of the carbonate-based PCD material 510.

Figure 6:
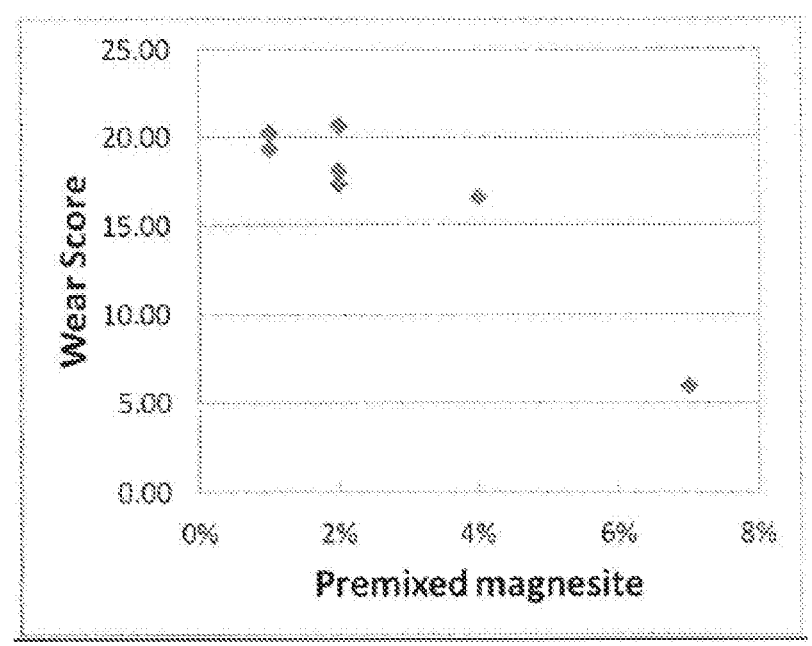
FIG. 6 shows a graph of the relationship between the amount of premixed magnesium carbonate and the wear score of the carbonate-based polycrystalline diamond body.

Carbonate-based PCD of the present disclosure may be formed by sintering a premixed diamond powder layer that includes a mixture of diamond particles and a sintering agent (a carbonate material selected from at least one of an alkaline earth metal carbonate and/or alkali metal carbonate) ranging from 0 to 4 percent by weight of the premixed layer (and optionally an amount of transition metal catalyst ranging from 0 to 4 percent by weight). Premixing 4 percent or less by weight of carbonate powder with diamond powder may provide a sintered PCD body having an improved wear resistance. For example, FIG. 6 shows a graph of the relationship between the amount of premixed magnesium carbonate within a premixed diamond layer and the wear score of the sintered PCD body. As shown, lower amounts (e.g., about 1 percent by weight, 2 percent by weight, and 4 percent by weight) of premixed magnesium carbonate resulted in a sintered PCD body having a higher wear score than PCD bodies formed with a higher amount (e.g., about 7 percent by weight) of magnesium carbonate premixed in the diamond layer. Improved wear scores are shown in sintered PCD bodies with 4 percent by weight or less of premixed magnesium carbonate. Additionally, other low amounts of premixed carbonate material may result in PCD bodies having improved wear resistance depending on, for example, the type of carbonate material and diamond grain size. Further, as mentioned above, additional carbonate material may be infiltrated into the diamond layer during the HPHT sintering process, for example, by placing an infiltration layer made of the additional carbonate material adjacent to the diamond layer. The graph shown in FIG. 6 shows the relationship between wear resistance of a sintered carbonate-based PCD body and the amount of premixed carbonate material, and does not include the effect of the infiltrated carbonate material.

However, according to other embodiments of the present disclosure, a carbonate-based PCD body may be formed by premixing diamond powder with an amount of carbonate sintering agent greater than 4 percent by weight of the premixed layer. For example, as described above with respect to Table 1 and FIG. 11, a premixed layer may include diamond powder and a carbonate sintering agent ranging up to about 8 percent by volume in some embodiments or up to about 10 percent by volume in other embodiments. The amount of sintering agent premixed with diamond powder may depend on, for example, the amount of carbonate infiltrant material being infiltrated into the diamond layer, the desired wear properties of the sintered diamond layer, the size of diamond particles used, the type of carbonate material used as the sintering agent and/or infiltrant material, etc., so long as appreciable diamond-to-diamond bonding still occurs during sintering to fall within the definition of polycrystalline diamond (PCD).

According to embodiments of the present disclosure, a carbonate-based PCD material may be sintered to a carbide substrate (with or without the use of a transition layer) by placing the PCD material and substrate within a sintering container and subjecting the assembly to a single HPHT sintering process including pressure conditions of greater than 7.0 GPa and temperature conditions of greater than 2,000° C. The sintering container may be formed of a refractory metal, such as tantalum. In some embodiments, prior to assembling and sintering a carbonate-based PCD construction, the inner surface of the sintering container may be coated with a nitride material, such as TiN or ZrN, to block cobalt infiltration through the container inner surface from the substrate to the PCD material. Alternatively or in addition to coating the inner surface of the sintering container, one or more outer surfaces of the substrate may be coated with the nitride material to block cobalt infiltration through the sides of the assembly (along the inner surface of the sintering container) from the substrate to the PCD material. For example, a carbonate-based PCD material and a substrate may be loaded into a sintering container for sintering, where each outer surface of the substrate may be coated with a nitride material. In other embodiments, the outer side surfaces of a substrate may be coated with the nitride material, such that an interface surface (i.e., the outer surface of the substrate facing the PCD material) and the outer surface of the substrate opposite from the interface surface are left uncoated. The inner surface of the sintering container and/or at least one outer surface of the substrate may be coated with a nitride material using coating methods known in the art.

Furthermore, some embodiments of the present disclosure may also include a second high pressure high temperature processing step. For example, a carbonate-based polycrystalline diamond body and a substrate may be sintered together in a single HPHT sintering step, such as described above. The carbonate-based PCD and substrate construction may then be subjected to a second high pressure high temperature condition for a short time to release residual stresses caused by the first sintering step, which may reduce the likelihood of cracking or delamination. The second high pressure high temperature conditions may include, for example, pressures of greater than 5.0 GPa and temperatures between about 800° C. and 1,400° C. within the diamond thermally stable region.

Figure 7:
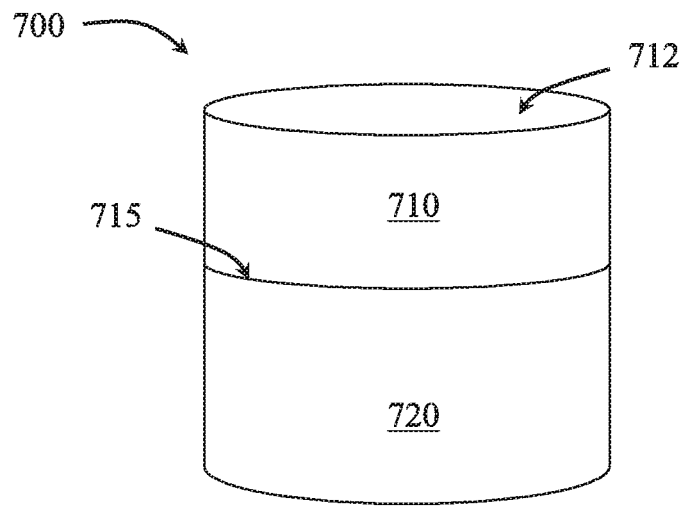
FIG. 7 shows a carbonate-based polycrystalline diamond cutting element according to embodiments of the present disclosure.

Carbonate-based polycrystalline diamond of the present disclosure may be used to form cutting tools for drilling earthen formations, such as cutting elements for use on downhole drill bits. Such cutting elements may include a carbonate-based polycrystalline diamond body bonded to a carbide substrate, where the carbonate-based polycrystalline diamond body has a working surface that contacts and cuts the earthen formation. For example, a cutting element according to embodiments of the present disclosure is shown in FIG. 7. The cutting element 700 has a carbonate-based PCD body 710 bonded to a carbide substrate 720 at an interface 715. As discussed above, the carbonate PCD body may be attached to the substrate directly (as shown), or with a transition layer made of at least one carbide material and/or at least one nitride material. The carbonate-based PCD body 710 has a working surface 712 distal from the substrate 720, which may be planar (as shown) or non-planar.

The carbonate-based polycrystalline diamond body 710 has a microstructure that includes a plurality of bonded together diamond grains forming a matrix phase, a plurality of interstitial regions interposed between the bonded together diamond grains, and a carbonate material disposed within the interstitial regions. The carbonate material may include at least one of an alkaline earth metal carbonate, such as magnesium carbonate, or a combination of an alkaline earth metal carbonate and an alkali metal carbonate. In some embodiments, the carbonate-based PCD material may also include a transition metal catalyst, such as cobalt, in addition to the carbonate material within the interstitial regions.

The carbonate-based PCD material may be formed by premixing a diamond powder layer with an amount of transition metal catalyst, such as cobalt, ranging from 0 to 4 percent by weight, for example, and an amount of carbonate sintering material, such as magnesium carbonate. According to some embodiments, the amount of premixed sintering agent may range from 0 to 4 percent by weight, and in other embodiments, the amount of premixed sintering agent may range up to about 15 percent by weight. The premixed diamond powder layer may be placed adjacent to a substrate having less than 10 percent by weight of a transition metal catalyst material, or adjacent to a transition layer placed on a substrate having less than 15 percent by weight of a transition metal catalyst material, within a sintering container and subjected to HPHT conditions. The substrate may be formed of metallic and carbide materials described above, but as an example, a tungsten carbide-cobalt substrate may be used. During the HPHT conditions, liquid WC—Co may start to form as the temperature reaches over about 1,370° C. The liquid WC—Co formed during HPHT conditions may be prevented or delayed from sweeping through the premixed diamond layer by the transition layer in embodiments having a transition layer, or may be slowed from sweeping through the premixed diamond layer due to a low amount of cobalt in the substrate (e.g., less than 10 percent by weight of cobalt) in embodiments having the premixed diamond layer directly adjacent to the substrate. Thus, before temperatures reach high enough to melt the carbonate material within the premixed diamond layer (and any carbonate material being infiltrated into the diamond layer from an infiltration layer, such as described above), the liquid WC—Co may partially infiltrate into the premixed diamond powder layer (i.e., infiltrate a partial distance from the interface surface of the premixed diamond layer into the diamond layer) or there may be no cobalt infiltration into the premixed diamond layer.

Partially infiltrated diamond layers may have the infiltrated WC—Co (or other carbide-transition metal catalyst used in a substrate) distributed as a gradient or relatively uniformly throughout the infiltrated depth of the sintered carbonate-based polycrystalline diamond body. For example, in some embodiments, a transition metal catalyst from an adjacent substrate may partially infiltrate into a premixed diamond layer a depth from the diamond layer/substrate interface into the diamond layer. Upon completing the sintering process, the transition metal catalyst from the adjacent substrate may be distributed within the interstitial regions of the formed carbonate-based PCD body throughout the depth from the diamond layer/substrate interface into the diamond layer. Embodiments having a gradient distribution may include comparatively lesser amounts of the transition metal catalyst within the interstitial regions at the depth of partial infiltration and comparatively greater amounts of the transition metal catalyst within the interstitial regions at the interface. For example, in embodiments having liquid WC—Co from an adjacent substrate partially infiltrated a depth into the diamond layer, the depth may have a gradient distribution of cobalt. The depth of partial infiltration may vary depending on, for example, the amount of transition metal catalyst material within the adjacent substrate, diamond and carbonate particle size, and the duration of the sintering process. For example, in embodiments using a carbide substrate with a low cobalt (or other transition metal catalyst) amount, melted cobalt/carbide from the substrate may not completely infiltrate into the diamond layer before reaching the melting temperature of the carbonate material and the carbonate begins to melt and form diamond-to-diamond bonding.

Further, a layer of carbonate material may be positioned adjacent to an outer surface of the premixed diamond powder layer to infiltrate into and form the carbonate-based PCD construction. For example, carbonate-based PCD material may be formed by optionally premixing a diamond powder layer with an amount of transition metal catalyst, such as cobalt, ranging from 0 to 4 percent by weight, for example, and a sintering agent (an amount of carbonate material, such as magnesium carbonate). The premixed diamond powder layer may be placed adjacent to a substrate having less than 10 percent by weight of a transition metal catalyst material, or adjacent to a transition layer placed on the substrate, within a sintering container and subjected to HPHT conditions. An infiltration layer made of a second carbonate material (an infiltrant material) may be placed adjacent to the premixed diamond powder layer along an outer surface opposite from the substrate (e.g., the surface that will become the working surface upon completion of the carbonate-based PCD cutting element). The second carbonate material may be selected from at least one of an alkaline earth metal carbonate or a mixture of alkaline earth metal carbonate and alkali metal carbonate, and may be the same or different carbonate material as the sintering agent premixed in the diamond powder layer, but as an example, magnesium carbonate may be used. Additionally, as discussed above, a transition metal catalyst from the substrate may or may not partially infiltrate into the premixed diamond layer during the HPHT sintering step at temperatures below the melting temperature of the carbonate material, depending on, for example, if a transition layer is used between the diamond layer and the substrate, if the substrate has low amounts of the transition metal catalyst, or the heating ramp. If the heating ramp is fast enough, for example, heated from 1,300° C. (2,372° F.) to 2,300° C. (4,172° F.) in less than 60 seconds, the carbonate in the infiltration layer may start to melt and infiltrate into the diamond layer to form carbonate PCD before Co/WC can be fully infiltrated into the diamond layer.

When the temperature of the HPHT process reaches the melting point of the second carbonate material (also referred to as infiltrant material), the second carbonate material may start to sweep into the diamond layer to form direct diamond-to-diamond bonding. In such embodiments, the second carbonate material may be distributed as a gradient or relatively uniformly a depth into the diamond layer from the outer surface of the diamond layer having the infiltration layer thereon. For example, in embodiments having the infiltration layer placed adjacent to the outer surface of the diamond layer eventually forming the cutting element working surface, the resulting carbonate-based PCD cutting element may have a gradient distribution of the second carbonate material extending a depth from the working surface. Depending on, for example, the amount of second carbonate material, the duration and conditions of the HPHT processing step, and the thickness of the diamond layer, the second carbonate material may extend a depth less than or equal to the entire thickness of the diamond layer. For example, according to some embodiments of the present disclosure, the second carbonate material from an infiltration layer may infiltrate the entire diamond layer, from the working surface to the interface surface. In yet other embodiments, an amount of second carbonate material may form the infiltration layer that is larger than the amount used to infiltrate the entire diamond layer. In such embodiments, the remaining infiltrant material (the infiltrant material that did not infiltrate into the diamond layer) may form a carbonate layer at the working surface of the diamond construction, and the carbonate layer may subsequently be removed.

A carbonate-based PCD body may be formed with infiltration from both a second carbonate material (from an infiltration layer) and a carbide-transition metal catalyst (from an adjacent substrate), where the infiltrated portions of the PCD body may have different microstructure compositions. For example, referring to FIG. 9, a diamond construction 900 according to embodiments of the present disclosure is shown. The diamond construction 900 has a carbonate-based PCD body 910 bonded directly to a substrate 920 at an interface 915 according to methods described herein. Particularly, the construction shown may be formed by placing a premixed diamond powder layer (e.g., a mixture of diamond, a carbonate sintering agent, and 0-4 percent by weight of cobalt) adjacent to a substrate 920 formed of tungsten carbide and less than 10 percent by weight of cobalt and within a sintering container. An infiltration layer formed of a second carbonate material (an infiltrant material) such as magnesium carbonate may then be placed adjacent to the outer surface of the diamond layer opposite from the substrate and within the sintering container. The sintering container and its contents may then be subjected to HPHT conditions to sinter together the diamond layer and the substrate. During the HPHT sintering step, the cobalt from the substrate may infiltrate into the diamond layer, as described above, and the magnesium carbonate from the infiltration layer may at least partially infiltrate a depth into the diamond layer from the outer surface, as also described above. The resulting carbonate PCD body 910 has two portions, 914, 916. As shown, the first portion 914 made of infiltrated second carbonate material extends a partial thickness of the PCD body 910, and the second portion 916 made of the infiltrated second carbonate material and the infiltrated cobalt extends a second partial thickness of the PCD body 910.

The first portion 914 may have a microstructure of interconnected diamond grains with a distribution of magnesium carbonate (and an amount of cobalt if any was premixed prior to sintering) disposed within the interstitial regions formed between the bonded together diamond grains. The first portion 914 is shown as forming a partial thickness of the diamond body 910. However, carbonate infiltrant material may infiltrate the entire thickness of the diamond layer, e.g., the infiltrated magnesium carbonate may extend from an outer surface 912 opposite the substrate 920 the entire depth into the diamond body 910. Thus, as the infiltrant material may infiltrate a depth larger than the thickness of the first portion 914, the first portion refers to a portion of the diamond body 910 that is substantially free of infiltrated binder from the substrate, such as cobalt. The second portion 916 may have a microstructure of interconnected diamond grains with magnesium carbonate (from the infiltrated and/or the premixed magnesium carbonate) and cobalt (infiltrated from the substrate) disposed within the interstitial regions formed between the bonded together diamond grains, where the cobalt extends from the interface 915 a depth into the diamond body 910. In some embodiments, there may be a gradient distribution of cobalt and magnesium elements within the sintered PCD body 910. However, according to other embodiments, an infiltrated carbonate material and an infiltrated carbide-transition metal catalyst may be substantially uniformly distributed throughout the sintered PCD body.

Figure 9:
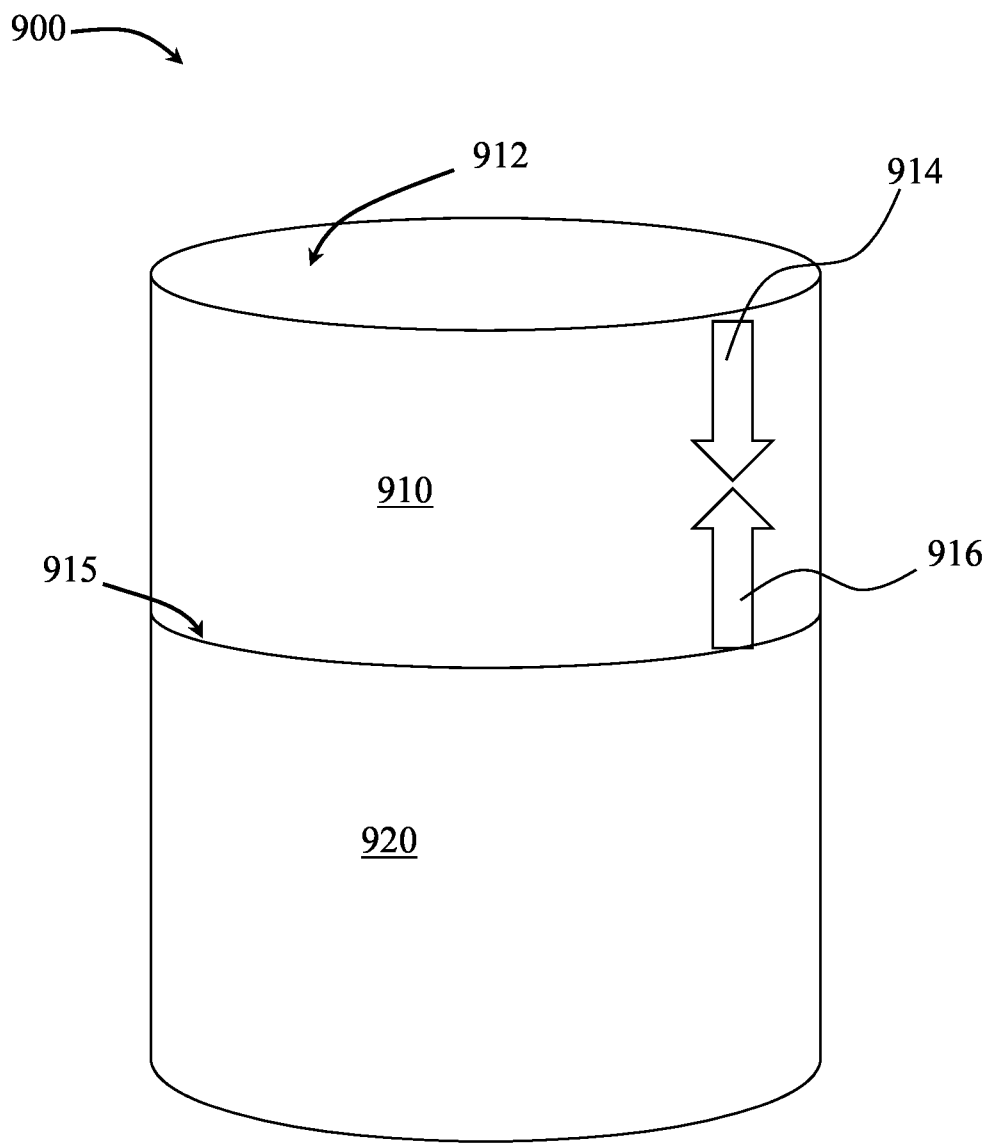
FIG. 9 shows a carbonate-based polycrystalline diamond construction according to embodiments of the present disclosure.

The diamond construction shown in FIG. 9 is formed using an infiltration layer formed of magnesium carbonate, a premixed diamond layer formed of diamond and magnesium carbonate (and optionally cobalt), and a substrate formed of tungsten carbide cobalt. Thus, in this example, reactions between diamond, cobalt and magnesium carbonate occur. For example, in areas of the PCD body where the cobalt amount is low, major phases within the sintered PCD body may be diamond, $MgCO_3$, MgO and CoO, and no metal cobalt phases may be detected. In areas of the PCD body where the cobalt amount is high, the sintered phases may include diamond, MgO, CoO and metal cobalt (Co), and no magnesium carbonate ($MgCO_3$) phases may be detected.

However, other embodiments may have other combinations of magnesium carbonate and cobalt introduced into the diamond layer, for example, magnesium carbonate and cobalt may be introduced into the diamond layer by infiltration, magnesium carbonate and cobalt may be introduced into the diamond layer by premixing the magnesium carbonate, cobalt and diamond, or one of magnesium carbonate and cobalt may be introduced into the diamond layer by infiltration. Further, other combinations of materials may be introduced into the diamond layer. For example, alkaline earth metal carbonates other than or in addition to magnesium carbonate may be infiltrated and/or premixed into the diamond layer. Additionally, transition metal catalysts other than or in addition to cobalt may be infiltrated and/or premixed into the diamond layer. In yet other embodiments, no transition metal catalyst may be introduced into the diamond layer. For example, in embodiments having no cobalt (or other transition metal catalyst) infiltrated or premixed within the diamond layer, the sintered PCD body may be formed of diamond and carbonate phases (e.g., bonded together diamond grains with the carbonate material disposed within the interstitial regions).

Figure 8:
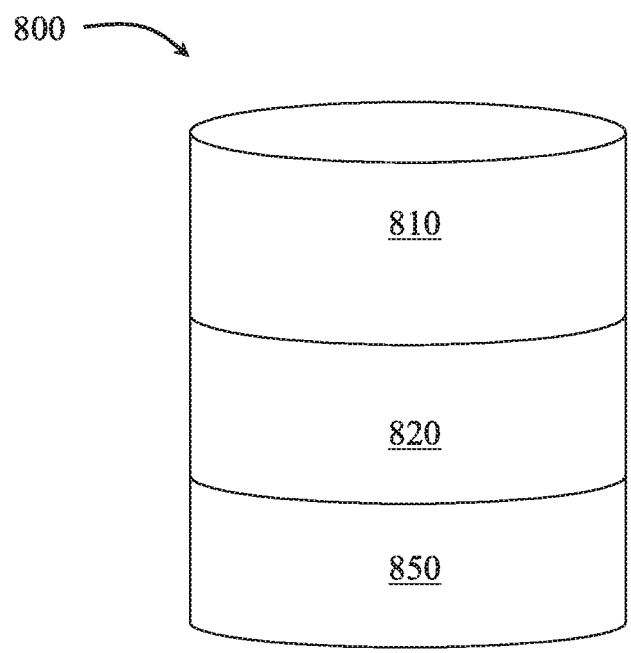
FIG. 8 shows a carbonate-based polycrystalline diamond cutting element according to embodiments of the present disclosure.

According to some embodiments, a diamond construction may also include a substrate extension. For example, in embodiments having a carbonate-based PCD material bonded to a substrate made with less than 10 percent by weight of a metal binder, an extension may be attached to the substrate, where the extension is made of a carbide material and a binder content of greater than 10 percent by weight. In some embodiments the extension may have a binder content of greater than 12 percent by weight, greater than 14 percent by weight in other embodiments, and greater than 16 percent by weight in yet other embodiments. An extension may be bonded to the substrate after sintering and finishing the PCD material, for example, by a traditional induction heating and brazing process to melt the braze alloy to bond two carbide surfaces together. The extension may also be bonded onto substrate at the HPHT pressing stage, e.g., two pieces of carbide may be stacked together during pre-press assembly and become joined together during the HPHT cycle. The carbide substrate in contact with the diamond or transition layer may have a low cobalt content (e.g., 6 to 10%) and the extension may have a higher cobalt content (e.g., 10 to 15%). Referring now to FIG. 8, a cutting element 800 according to embodiments of the present disclosure is shown that includes a carbonate-based PCD material 810 attached to a substrate 820 and a substrate extension 850 attached to the substrate 820 opposite from the PCD material 810. The substrate extension 850 may be formed of a carbide material (e.g., tungsten carbide) and a binder content (e.g., cobalt) of greater than 10 percent by weight. The cutting element 800, including the substrate extension 850, may be brazed to a drill bit, for example.

Carbonate-based PCD may have improved thermal stability and high wear resistance. However, many applications of carbonate-based PCD, such as the carbonate-based PCD cutting elements described herein, may include a carbonate-based PCD body bonded to a substrate, for example, in order to attach a carbonate-based PCD cutting element to a drill bit. Conventionally formed substrates, such as substrates made of tungsten carbide and about 10 to 16 percent by weight of cobalt, have a much lower melting point when compared with carbonate materials, such as magnesium carbonate. For example, a conventionally formed substrate made of tungsten carbide and 10-16 percent by weight of cobalt may have a melting point of about 1,370° C. (2,498° F.), while magnesium carbonate may have a melting point of above 1,600° C. (2,912° F.) at pressures of greater than 6 GPa. Further, as described above, carbonate-based PCD may be formed in sintering conditions having pressures greater than 7 GPa and temperatures greater than 2,000° C. (3,632° F.). Thus, a conventionally formed substrate may not be directly sintered to a carbonate-based PCD material without the diamond material being completely infiltrated by the substrate material. For example, a carbonate-based PCD body may not be directly sintered to a conventionally formed tungsten carbide cobalt substrate (having about 10 to 16 percent by weight of cobalt) because before the temperature conditions reach the melting point of the carbonate material (thus providing conditions for formation of carbonate-based PCD) the tungsten carbide cobalt of the substrate may melt and infiltrate into the diamond layer. However, by using methods described herein, a carbonate-based PCD body may be sintered to a substrate using a single HPHT process.

Polycrystalline diamond bodies made according to embodiments of the present disclosure may be used as cutting elements on down hole cutting tools, such as drill bits. For example, down hole tools of the present disclosure may have a body, a plurality of blades extending from the body, and at least one polycrystalline diamond cutting element according to embodiments of the present disclosure disposed on the plurality of blades. The at least one polycrystalline diamond cutting element is disposed on the blades such that a working surface, i.e., a surface that contacts and cuts the formation being drilled, is positioned at a leading face of the blade and faces in the direction of the drill's rotation. The polycrystalline diamond cutting element may include a polycrystalline diamond body made of a plurality of bonded together diamond grains forming a matrix phase, a plurality of interstitial regions interposed between the bonded together diamond grains, and a carbonate material disposed within the interstitial regions, where the carbonate material is selected from at least one of an alkali metal carbonate and an alkaline earth metal carbonate.

Figure 10:
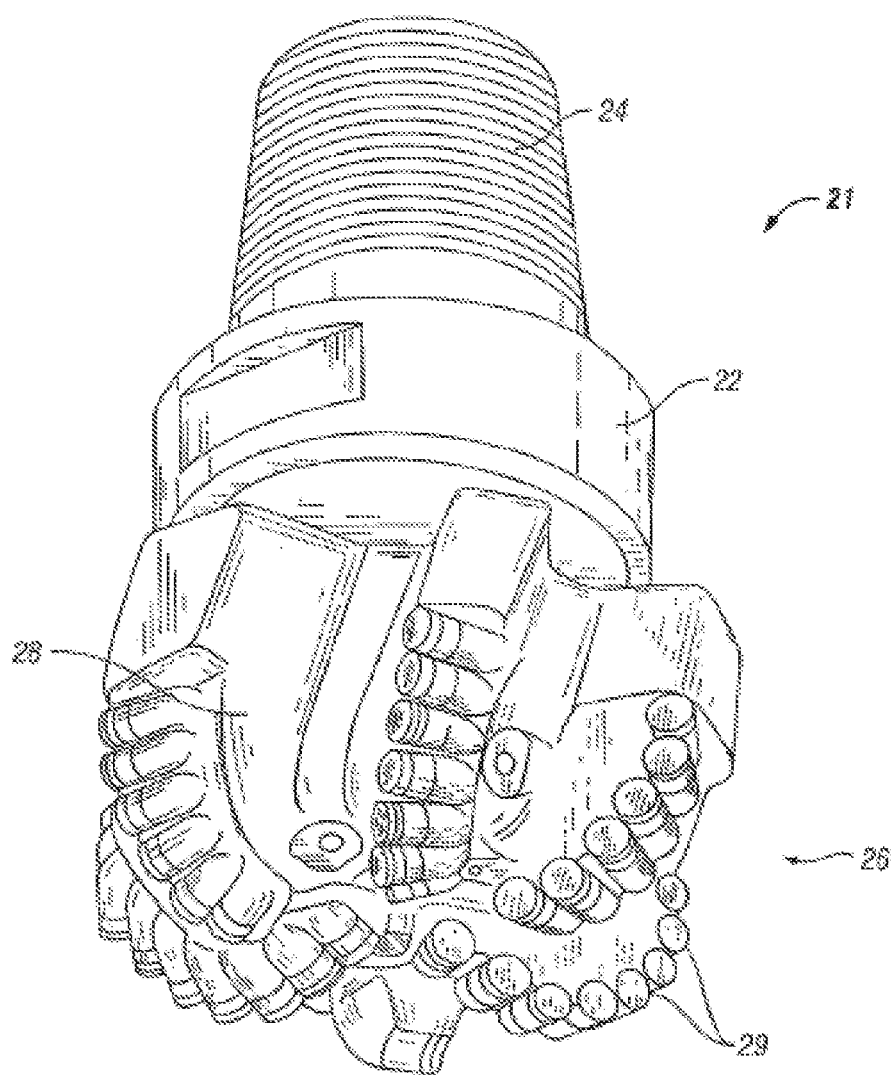
FIG. 10 shows a down hole tool according to embodiments of the present disclosure.

An example of a down hole tool of the present disclosure, a drill bit, is shown in FIG. 10. The drill bit 21 includes a bit body 22 having a threaded upper pin end 24 and a cutting end 26. The cutting end 26 includes a plurality of blades 28 arranged about the rotational axis of the drill bit and extending radially outward from the bit body 22. Cutting elements 29 including the polycrystalline diamond material of the present disclosure are disposed in the blades 28 at predetermined angular orientations and radial locations relative to a working surface and with a desired back rake angle and side rake angle against a formation to be drilled.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method of forming a diamond construction, comprising:
   disposing a carbonate-based polycrystalline material in a sintering container, the carbonate-based polycrystalline material comprising diamond and a carbonate material comprising at least one alkaline earth carbonate;
   placing a substrate in the sintering container, wherein the substrate comprises less than 10 percent by weight of a transition metal catalyst,
   attaching an extension to the substrate, wherein the extension comprises a carbide material and a binder content of greater than 10 percent by weight; and subjecting the sintering container and contents therein to high pressure high temperature conditions to form a carbonate-based polycrystalline diamond body bonded to the substrate.

2. The method of claim 1, wherein the carbonate material further comprises an alkali metal carbonate.

3. The method of claim 1, wherein the carbonate-based polycrystalline material further comprises between 0 and 4 percent by weight of the transition metal catalyst.

4. The method of claim 1, wherein the carbonate-based polycrystalline diamond material is a preformed carbonate-based polycrystalline diamond body.

5. The method of claim 1, wherein the carbonate-based polycrystalline material is a premixed powdered layer.

6. The method of claim 1, further comprising assembling a transition layer between the carbonate-based polycrystalline diamond material and the substrate.

7. The method of claim 6, wherein the transition layer comprises a mixture of diamond powder and a transition layer carbonate material comprising at least one of an alkaline earth metal carbonate or a combination of an alkaline earth metal carbonate and an alkali metal carbonate, wherein the transition layer carbonate material comprises between 4 percent by weight and 30 percent by weight of the transition layer.

8. The method of claim 1, further comprising placing an infiltration layer adjacent to the carbonate-based polycrystalline material and opposite the substrate, wherein the infiltration layer comprises a second carbonate material.

* * * * *